Patented June 12, 1928.

1,672,924

UNITED STATES PATENT OFFICE.

RAYMOND F. BACON, OF BRONXVILLE, NEW YORK.

RECOVERY OF SULPHUR FROM IRON SULPHIDES.

No Drawing.  Application filed April 13, 1927. Serial No. 183,438.

This invention relates to the recovery of sulphur from iron sulphides, and has for its object the provision of an improved method of recovering sulphur in elemental form from iron sulphides.

The invention is based on my discovery that certain iron sulphides, such as the monosulphide or ferrous sulphide (FeS) and even certain natural sulphides of the type of Pyrhotite, will react with sulphurous acid solution to form an oxide of iron and elemental sulphur. It is probable that the sulphurous acid reacts with the iron sulphide to form ferrous sulphites and hydrogen sulphide, and that the hydrogen sulphide then reacts with sulphur dioxide (of the sulphurous acid) forming elemental sulphur, and probably also the hydrogen sulphide reacts with the ferrous sulphites forming an oxide of iron and elemental sulphur. While the actual chemical reactions taking place are undoubtedly complicated, I believe the following equations fairly represent the ultimate results:

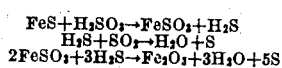

My present invention is based on the foregoing discovery, and involves the recovery of sulphur in elemental form from iron sulphides approximating in composition the monosulphide of iron by subjecting the iron sulphide to the action of sulphurous acid and thereby forming elemental sulphur and oxide of iron, and then appropriately recovering the resulting elemental sulphur. The iron sulphide may be a natural sulphide, or may be produced by appropriate treatment of sulphides not themselves directly amenable to the reaction characteritstic of the present invention. Pressure and elevated temperatures are favoring factors, and may be made use of if desired.

In the practice of the invention, starting with iron pyrites, I first remove from the pyrites a part of the sulphur in any appropriate manner. Thus, the desired amount of sulphur may be removed by distillation of the pyrites, or by treatment of the pyrites with steam, or by partial oxidation of the pyrites with air, or by partial reduction of the pyrites with iron. In any event, an amount of sulphur is removed from the pyrites so that the iron sulphide remaining in the original pyritic material approaches the formula of the monosulphide of iron (FeS).

The remaining product containing iron sulphide approximating in composition the monosulphide of iron is now introduced into a tank of water, and sulphur dioxide gas is passed into the tank. The sulphurous acid, formed by the sulphur dioxide and water, reacts with the iron sulphide forming elemental sulphur and oxide of iron. The water in the tank may be heated to any appropriate temperature, or may be subjected to pressure, or both pressure and heating of the water may be employed. Higher temperature may, of course, be used when the water in the tank is maintained under pressure.

The elemental sulphur is separated from the residue in any appropriate manner. Thus, the residue may be subjected to appropriate separatory or concentrating treatments depending on the difference in gravity of sulphur and iron oxide. The sulphur may be removed by heating the residue to a temperature above the melting point of sulphur, and the resulting fused or molten sulphur segregated and recovered. Where relatively high temperatures and pressures are employed in the treatment of the iron sulphide with sulphurous acid, the elemental sulphur may be collected in the reaction tank in a molten or fused condition and appropriately withdrawn therefrom.

The principles of the invention may be applied to metal sulphides other than iron sulphides, which are known to be soluble in acids. Thus, for example, zinc sulphide may be used instead of iron sulphide. In the appended claims it is my intention to include other metal sulphides that react with sulphurous acid in a manner equivalent to iron sulphides approximating in composition the monosulphide of iron.

I claim:

1. The method of recovering sulphur from iron sulphides approximating in composition the monosulphide of iron which comprises subjecting the iron sulphide to the action of sulphurous acid and thereby forming elemental sulphur and oxide of iron, and recovering the elemental sulphur so formed.

2. The method of recovering sulphur from iron sulphides approximating in composition the monosulphide of iron which comprises subjecting the iron sulphide to the action of sulphur dioxide in the presence of water and thereby forming elemental sulphur, and recovering the elemental sulphur so formed from the resulting residue.

3. The method of recovering sulphur from iron sulphides approximating in composition the monosulphide of iron which comprises introducing the iron sulphide into a body of water, passing sulphur dioxide gas through the water and thereby forming elemental sulphur, and recovering the elemental sulphur so formed from the resulting residue.

4. The method of recovering sulphur from iron pyrites which comprises partially removing sulphur from the pyrites until the iron sulphide remaining therein approximates in composition the monosulphide of iron, subjecting the so-treated pyritic material to the action of sulphurous acid and thereby forming elemental sulphur, and recovering the elemental sulphur so formed from the resulting residue.

5. The method of recovering sulphur from iron pyrites which comprises partially removing sulphur from the pyrites until the iron sulphide remaining therein approximates in composition the monosulphide of iron, subjecting the so-treated pyritic material to the action of sulphur dioxide in the presence of water and thereby forming elemental sulphur, and recovering the elemental sulphur so formed from the resulting residue.

6. The method of recovering sulphur from iron sulphides approximating in composition the monosulphide of iron which comprises subjecting the iron sulphide to the action of sulphurous acid at a pressure substantially higher than atmospheric pressure and thereby forming elemental sulphur, and recovering the elemental sulphur so formed from the resulting residue.

7. The method of recovering sulphur from iron sulphides approximating in composition the monosulphide of iron which comprises subjecting the iron sulphide to the action of sulphurous acid at a temperature substantially higher than atmospheric temperature and thereby forming elemental sulphur, and recovering the elemental sulphur so formed from the resulting residue.

8. The method of recovering sulphur from iron sulphides approximating in composition the monosulphide of iron which comprises subjecting the iron sulphide to the action of sulphurous acid at a temperature and pressure substantially higher than atmospheric temperature and pressure and thereby forming elemental sulphur, and recovering the elemental sulphur so formed from the resulting residue.

In testimony whereof I affix my signature.

RAYMOND F. BACON.